United States Patent
Xu et al.

(10) Patent No.: US 9,934,073 B2
(45) Date of Patent: Apr. 3, 2018

(54) EXTENSION OF RESOURCE CONSTRAINTS FOR SERVICE-DEFINED CONTAINERS

(71) Applicant: Futurewei Technologies, Inc., Plano, TX (US)

(72) Inventors: Jun Xu, Cupertino, CA (US); Huiyang Yang, Cupertino, CA (US); Rangaraju Iyengar, Morgan Hill, CA (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 14/921,724

(22) Filed: Oct. 23, 2015

(65) Prior Publication Data

US 2017/0116042 A1 Apr. 27, 2017

(51) Int. Cl.
*G06F 9/50* (2006.01)
(52) U.S. Cl.
CPC .......... *G06F 9/5083* (2013.01); *G06F 9/5077* (2013.01); *G06F 2209/5014* (2013.01)
(58) Field of Classification Search
CPC ................................................. G06F 9/5083
See application file for complete search history.

(56) References Cited

U.S. PATENT DOCUMENTS

2009/0271472 A1 10/2009 Scheifler et al.
2013/0163417 A1* 6/2013 Gupta ................ H04L 47/2475
                                                    370/230
2013/0346969 A1* 12/2013 Shanmuganathan . G06F 9/4856
                                                    718/1
2014/0208329 A1* 7/2014 Abali .................... G06F 9/4856
                                                    718/104
2016/0092252 A1* 3/2016 Wagner ............... G06F 9/45533
                                                    718/1

FOREIGN PATENT DOCUMENTS

CN        103034526 A     4/2013
CN        103870341 A     6/2014

OTHER PUBLICATIONS

FrankBrix, Understanding VMware Reservations, Limits and Shares, 2013, [retrieved on Oct. 11, 2016]. Retrieved from the Internet <URL:http://www.vfrank.org/2013/09/19/understanding-vmware-reservations-limits-and-shares/>.*

(Continued)

*Primary Examiner* — Charlie Sun
(74) *Attorney, Agent, or Firm* — Conley Rose, P.C.

(57) ABSTRACT

A method comprising receiving, by a processing thread executing on a host server, a container request to create a container on the host server by employing a container engine, wherein the container request indicates a first resource constraint and a second resource constraint for executing an application within the container, directing, by the processing thread, the container engine to create an operating environment for the container according to the first resource constraint and to execute the container on the host server, reserving, by the processing thread, a first resource from an operating system (OS) of the host server according to the second resource constraint of the container request, and updating dynamically, by the processing thread, the operating environment of the container to enable the container to directly utilize the reserved first resource for execution of the application to meet the second resource constraint of the container request.

20 Claims, 7 Drawing Sheets

(56) References Cited

OTHER PUBLICATIONS

CN103034526A, translated copy, 2013.*
Tanenbaum, A, Modern Operating System, 3d, Pearson Prentice Hall, 2008.*
"Docker," Downloaded from the Internet, Wayback Machine, Jun. 12, 2014, 4 pages.
Foreign Communication From a Counterpart Application, PCT Application No. PCT/CN2015/093103, English Translation of International Search Report dated Jun. 21, 2016, 7 pages.
Foreign Communication From a Counterpart Application, PCT Application No. PCT/CN2015/093103, English Translation of Written Opinion dated Jun. 21, 2016, 5 pages.

* cited by examiner

EXTENSION OF RESOURCE CONSTRAINTS FOR SERVICE-DEFINED CONTAINERS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The rapid growth of Internet of Things (IoT) has been driven in part by accessibility of wireless modules, sensors, and microcontrollers. As the number and variety of connected devices increases, the demand for applications to interface with the devices and to process the large quantities of data produced by the devices also increases. To match this growing demand, web and mobile application developers are aligning their development practices and methodologies to meet the challenges of the IoT applications. Computing virtualization may be an attractive solution for the developers to rapidly develop, test, and deploy IoT applications across multiple platforms.

SUMMARY

In one embodiment, the disclosure includes a method comprising receiving, by a processing thread executing on a host server, a container request to create a container on the host server by employing a container engine, wherein the container request indicates a first resource constraint and a second resource constraint for executing an application within the container, directing, by the processing thread, the container engine to create an operating environment for the container according to the first resource constraint and to execute the container on the host server, reserving, by the processing thread, a first resource from an operating system (OS) of the host server according to the second resource constraint of the container request, and updating dynamically, by the processing thread, the operating environment of the container to enable the container to directly utilize the reserved first resource for execution of the application to meet the second resource constraint of the container request.

In another embodiment, the disclosure includes a host server comprising an input/output (IO) interface, a user interface configured to receive a container request to create a container on the host server, wherein the container request indicates a first resource constraint for executing an application within the container, and a processor coupled to the I/O interface and the user interface, wherein the processor is configured to reserve a first portion of a physical resource from an OS of the host server according to the first resource constraint, and configure an operating environment for the container to directly utilize the reserved first portion of the physical resource for execution of the application, wherein the first resource constraint comprises an absolute limit associated with the I/O interface, and wherein the first portion is an absolute portion of the physical resource.

In yet another embodiment, the disclosure includes a method comprising receiving, by a processing thread executing in an isolated user-space of a host server, access to a first portion of a first physical resource of the host server, wherein the first physical resource is managed by an OS, receiving, by the processing thread, access to a second portion of a second physical resource of the host server, wherein the second physical resource is managed by the OS, and executing, by the processing thread, an application by directly communicating with the OS to utilize the first portion of the first physical resource and the second portion of the second physical resource, wherein the first physical resource and the second physical resource are different orthogonal resources.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In computing, virtualization is a broad term that refers to the abstraction of computing resources, which may include hardware components and software components. Virtualization makes a single physical resource (such as a server or a host server, an operating system, an application, and/or a storage device) function as multiple logical resources. Server virtualization may be performed at multiple levels, such as full virtualization, para-virtualization, and operating system (OS)-level virtualization. In full virtualization, a hypervisor directly interacts with physical resources of a physical server and creates one or more virtualized platforms. Each virtualized platform hosts an independent virtual server or virtual machine (VM) with an unmodified OS of any type and a copy of all the underlying physical resources. In para-virtualization, the OS operating on a virtual server may be modified to optimize interactions with a hypervisor. In OS-level virtualization, virtualized platforms directly utilize an underlying OS. For example, the underlying OS allows multiple isolated user-space software instances to share the physical resources. An example of an isolated user-space software instance is a container. Comparing VMs to containers, VMs consume more resources and comprise more processing overhead, but may provide better isolation and security.

Figure 1:
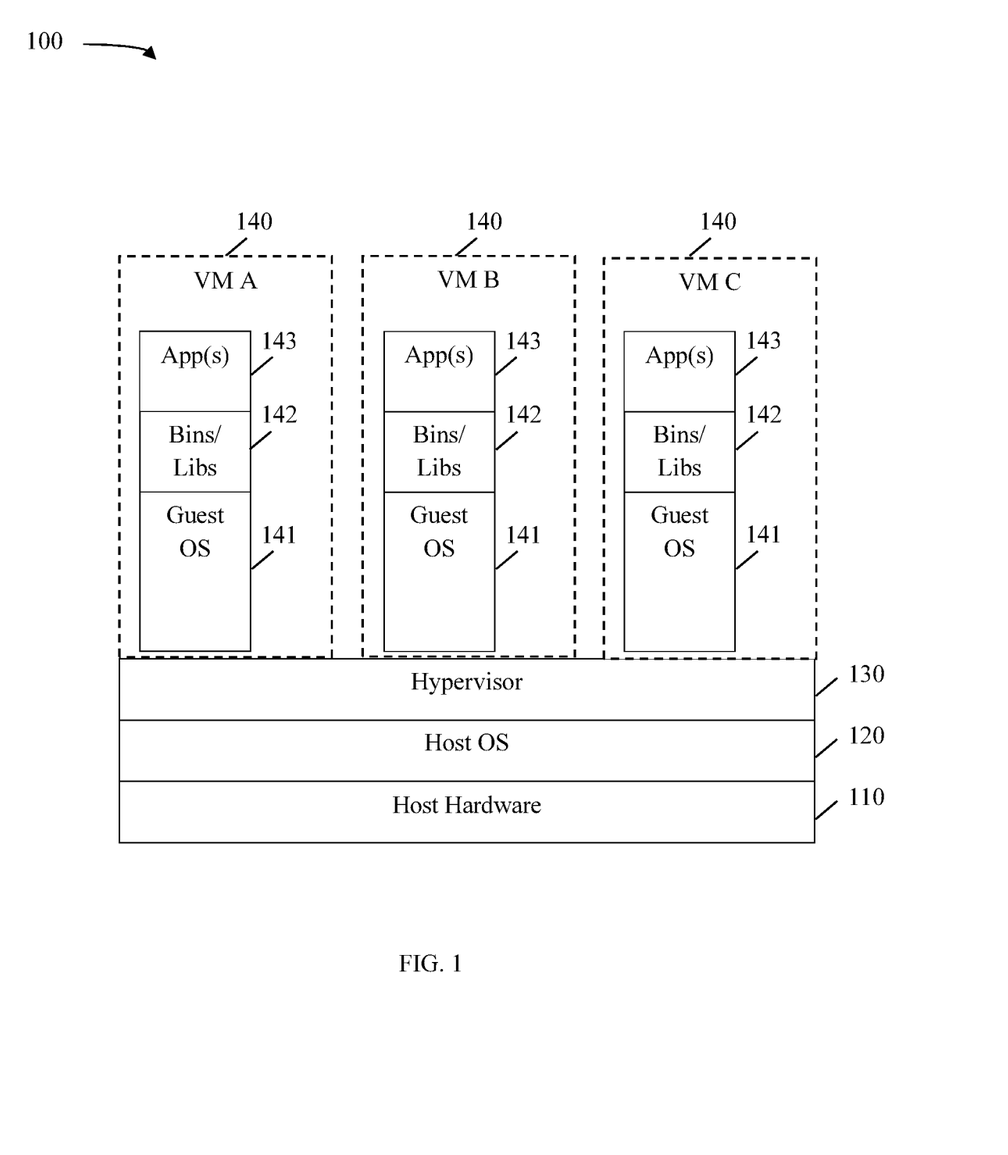
FIG. 1 is a schematic diagram of an embodiment of a host server hosting a plurality of virtual machines (VMs).

FIG. 1 is a schematic diagram of an embodiment of a host server 100 hosting a plurality of VMs 140, shown as VMs A, B, and C. The host server 100 comprises host hardware 110 suitable for processing data. For example, the host hardware 110 may comprise one or more central processing units (CPUs), one or more memory devices, I/O ports, and network ports. Various software programs and/or components may be executed by the host hardware 110. As shown, the host hardware 110 is configured to execute a host OS 120, a hypervisor 130, and the VMs 140.

The host OS 120 may be any OS configured to manage and control hardware resources provided by the host hardware 110. Some examples of OSs may include Windows®, Linux®, and Unix®. The host OS 120 may comprise various components, such as a process management component, a memory management component, a file system management component, an I/O system management component, and/or a protection system component. The process management component manages CPU utilization and schedules processes, such as the hypervisor 130 and the VMs 140 that are executed in the host server 100. The memory management component manages memory consumed by the processes. For example, the memory management component may perform memory allocation and de-allocation and/or track and maintain memory states and/or statuses. The file system management component manages the storages of files utilized by the processes. The I/O system management component manages the transferring of I/O data, produced or consumed by the processes, between the host server 100 and external devices and systems. Some examples of external devices may include network devices, such as routers, sensors, mobile devices, and servers. The protection system component protects the hardware resources such as CPUs and memory of the host hardware 110 and data stored on the host hardware 110 and control accesses by the processes.

The hypervisor 130 is a VM monitor (VMM), which is a software component configured to create, execute, and manage the VMs 140. The hypervisor 130 interacts with the host OS 120 to emulate all hardware resources, such as CPU, memory, I/Os, and network resources provided by the host hardware 110, enabling the VMs 140 to share the hardware resources. The hypervisor 140 may emulate multiple virtualized platforms that are isolated from each other, allowing the VMs 140 to operate independently from each other on the same underlying host hardware 110.

Each VM 140 is a software instance executed by the host hardware 110 and controlled by the hypervisor 130. Each VM 140 operates similar to a physical computer with a guest OS 141 and a virtual copy of all hardware resources available in the host hardware 110. The guest OSs 141 may perform similar functions as the host OS 120. For example, the guest OSs 141 manages the virtualized hardware resources provided by the hypervisor 130 and provides OS services, such as scheduling, memory management, and I/O services, to the applications 143. The guest OSs 141 may be any types of OSs, which may be the same as the host OS 120 or different from the host OS 120. For example, the host OS 120 may be a Windows OS and the guest OS 141 of the VM A 140 may be a Linux® OS. Alternatively, the host OS 120 and the guest OS 141 of the VM A 140 are both Linux® OS. In addition, the guest OSs 141 may be the same type of OSs or different types of OSs.

Each VM 140 may provide a set of binaries and libraries (Bins/Libs) 142 and may execute one or more applications 143. The binaries and libraries 142 may include executable object codes, such as tools, and compiled object codes that may be dynamically linked by the applications 143 for execution to provide runtime support. The applications 143 may be any type of applications, such as web client applications and web server applications. The applications 143 and the guest OSs 141 are unaware of the virtualized operating environment and operate as if they are operating in a standalone physical computer.

Figure 2:
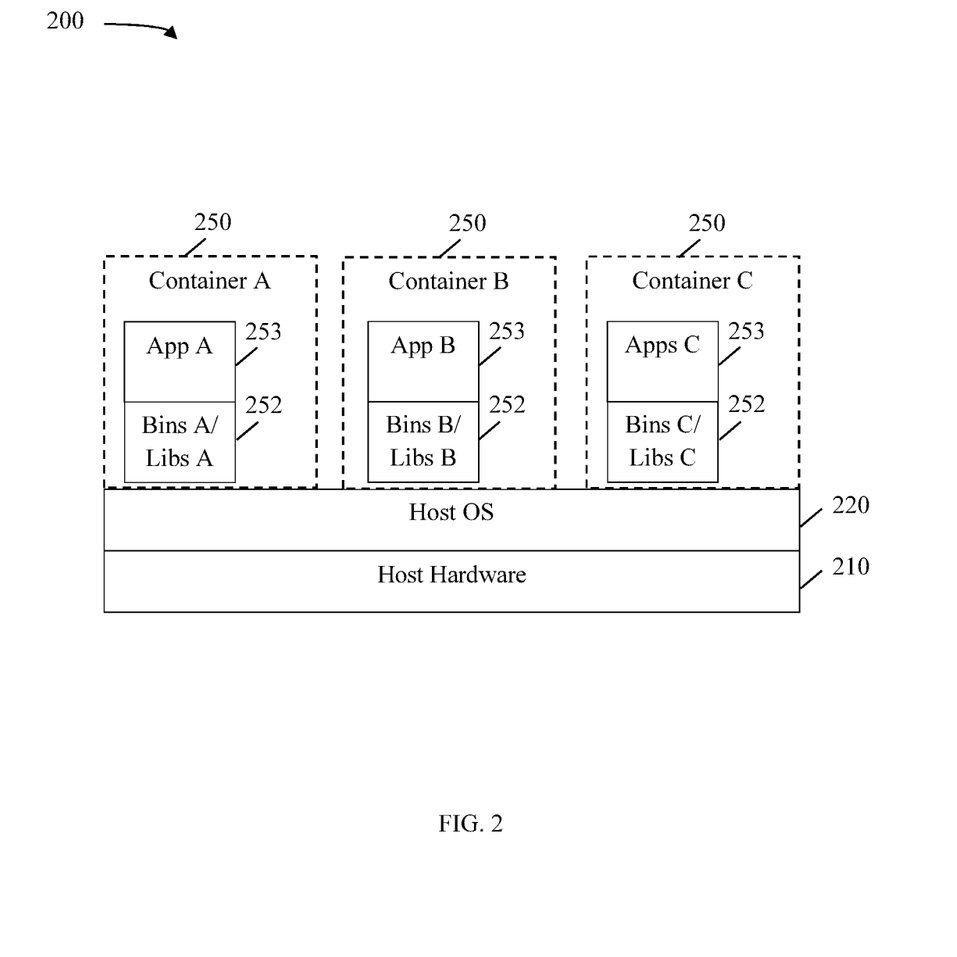
FIG. 2 is a schematic diagram of an embodiment of a host server hosting a plurality of containers.

FIG. 2 is a schematic diagram of an embodiment of a host server 200 hosting a plurality of containers 250, shown as Containers A, B, and C. The host server 200 comprises host hardware 210 similar to the host hardware 110. The physical resources of the host hardware 210 are managed by a host OS 220 similar to the host OS 120. However, the host OS 220 provides OS-level virtualization to allow the containers 250 to directly utilize the physical resources of the host hardware 210, but execute in isolated user-space. Although the host OS 220 is shared, individual containers 250 have independent file systems and independent process spaces.

Each container 250 is configured to execute a particular application 253 and may include just enough resources for the execution of the application 253. The application 253 is similar to the applications 143. The container 250 may further includes all dependencies, such as the binaries and libraries 252, that are required by the execution of the application 253. The binaries and libraries 252 are similar to the binaries and libraries 142. As shown, the container A 250 is configured with a set of binaries and libraries 252, shown as Bins A/Libs A, for executing an application A 253. The container B 250 is configured with a set of binaries and libraries 252, shown as Bins B/Libs B, for executing an application B 253. The container C 250 is configured with a set of binaries and libraries 252, shown as Bins C/Libs C, for executing a plurality of applications C 253. Although a container 250 is often configured to execute one particular application 253, the container 250 may be configured to execute any number of applications 253.

When compared to the hypervisor-based virtualization in the host server 100, the containers 250 utilize significant less hardware resources than the VMs 140 and comprise significantly less processing overheads than the VMs 140. However, the containers 250 are based on the same type of OS as the underlying host OS 220 instead of any type of OSs as in the VMs 140. For example, when the host OS 220 is a Linux® OS, the containers 250 are presented as Linux® servers to the applications 253. Although the elimination of the hypervisor 130 and the guest OSs 141 enables the host server 200 to provide virtualization with higher efficiency and lighter-weight, the host server 200 may only provide the containers 250 with limited I/O support and may not guarantee a particular I/O performance metric. For example, a container 250 may be provided with an I/O path for transferring data in and out of the container 250, but may not be provisioned with a guaranteed I/O bandwidth. In general, the host OS 220 provides the container 250 with a limited subset of the total physical resources.

Figure 3:
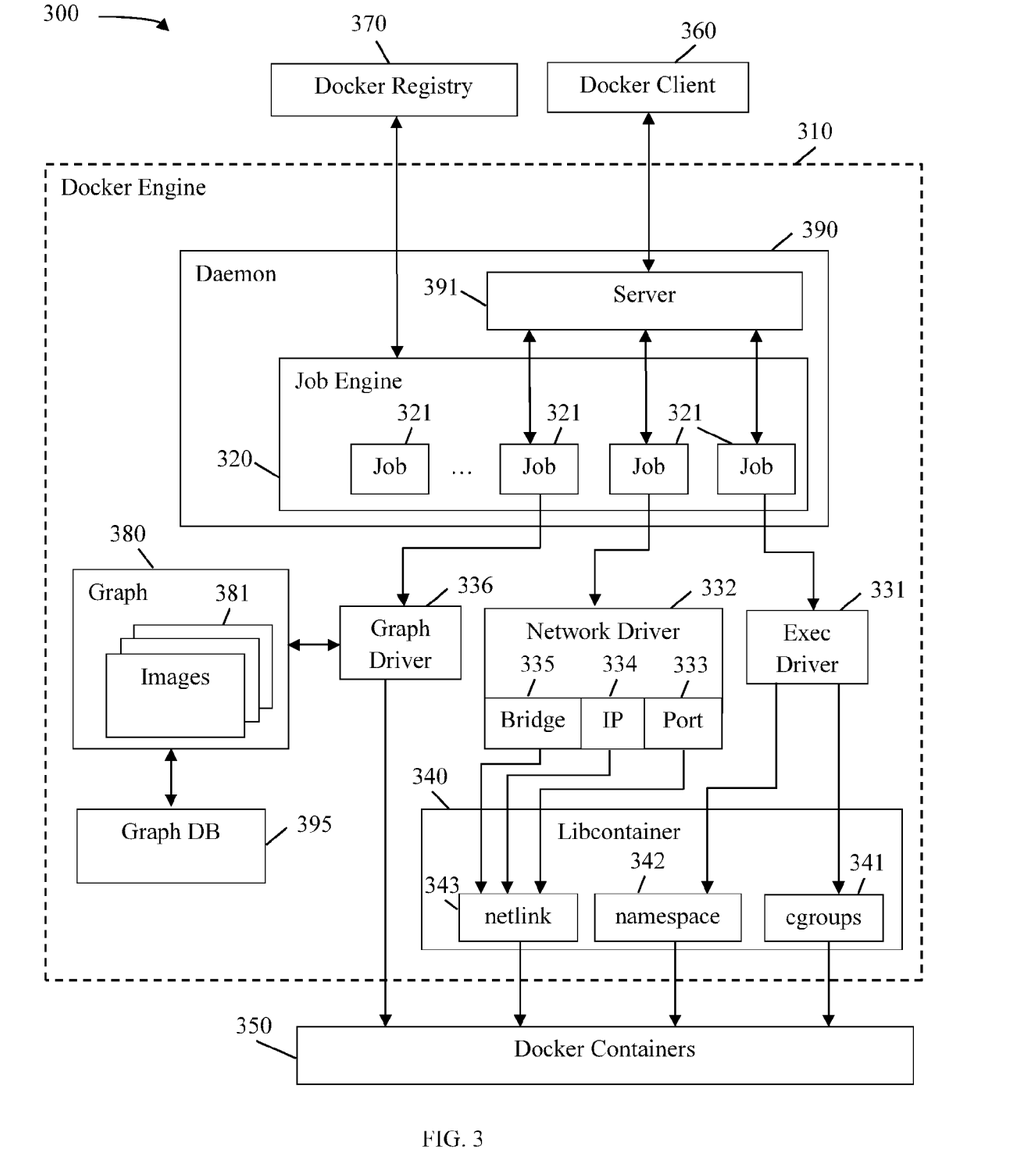
FIG. 3 is a schematic diagram of an embodiment of a Docker® container system.

FIG. 3 is a schematic diagram of an embodiment of a Docker® container system 300. The system 300 employs similar container-based virtualization mechanisms as the host server 200, and employs a Docker® engine 310 to provide an integrated environment with tools and workflows for generating, starting, and controlling Docker® containers 350 similar to the containers 250. The Docker® engine 310 and the Docker® containers 350 are executed by a host server similar to the host server 200. Once the Docker® engine 310 generates and starts the Docker® containers 350 on the host server, the Docker® containers 350 are functionally the same as the containers 250. Each Docker® container 350 is an isolated user-space software instance that directly utilizes OS services provided by an underlying host OS similar to the host OSs 120 and 220. The underlying host OS may be a Linux® OS. The Docker® Engine 310 comprises a daemon 390, a graph driver 336, a network driver 332, an execution (exec) driver 331, and a library container (libcontainer) 340. In the system 300, the creation of the Docker® containers 350 are initiated by a Docker® client 360. The client 360 is a software component configured to accept container management commands from users and communicates back and forth with the daemon 390. The client 360 may be executed on the same host server as the Docker® engine 310 and the Docker® containers 350 or on a remote server.

The daemon 390 is a software component that runs in a background process in the host server. The daemon 390 accepts and processes container creation requests received from the Docker® client 360. The daemon 390 comprises a server 391 and a job engine 320. The server 391 is configured to receive and dispatch the received requests to the job engine 320 and to send responses to the client 360. The job engine 320 is configured to perform a plurality of jobs 321 according to the dispatched requests. The jobs 321 are actions for creating and building images for the Docker® containers 350 and starting and monitoring the Docker® containers 350. The jobs 321 may complete some of the actions by coordinating with the graph driver 336, the network driver 332, the exec driver 331, and a Docker® registry 370.

The Docker® registry 370 is an image repository on a remote server. The Docker® registry 370 operates as a container image store. Since Docker® is an open source platform, developers may share images by uploading newly created images to the Docker® registry 370 or downloading existing images from the Docker® registry 370. In addition, the Docker® images are built by employing a layered approach, where multiple images, such as an Ubuntu image and an Apache image, may be combined to form a complete Docker® container 350 image. Thus, a job 321 may create an image for a Docker® container 350 by downloading one or more images from the Docker® registry 370.

The graph driver 336 is a software component configured to coordinate with one or more jobs 321 responsible for creating and building images for the Docker® containers 350. For example, the graph driver 336 stores the downloaded images locally as images 381 in a graph 380 and tracks or maintains information associated with the images 381 in a graph database (DB) 395.

The network driver 332 is a software component configured to create a network device, network stack, and/or network environment for the Docker® containers 350. As shown, the network driver 332 may allocate the Docker® containers 350 with network interfaces including port 333, an Internet protocol (IP) interface 334, and a bridge 335. A bridge 335 interface is a virtual Ethernet bridge coupled to a network interface of any types on the host server 300, a port 333 is a mapped port on the host server 300, and an IP interface 334 is mapped to a network interface on the host server 300 that forwards packets based on the IP protocol.

The exec driver 331 is a software component configured to create operations and resources for the Docker® containers 350, launch or start the Docker® containers 350, and monitor and manage the resource utilizations of the Docker® containers 350.

The libcontainer 340 is a software component that provides a plurality of Linux® kernel functionalities for building the Docker® containers 350. The libcontainer 340 comprises a control groups (cgroups) component 341, a namespace component 342, and a netlink component 343. The cgroups component 341 applies resource usage limitations and isolations on the Docker® containers 350. The namespace component 342 provides each Docker® container 350 with an isolated workspace, which may include processes, network interfaces, inter-process communication (IPC) resources, and mount points or file systems. The netlink component 343 provides the Docker® containers 350 with IPC interfaces and network interfaces.

As an example, a user requests a Docker® container 350 via the client 360. The request indicates resource constraints for executing an application within the Docker® container 350. The server 391 processes the request and dispatches the request to the job engine 320. The job engine 320 executes a first job 321 to create an image for the requested container according to the received request. The first job 321 downloads one or more images from the Docker® registry 370 and sends the downloaded images to the graph driver 336, which stores and tracks the images. The job engine 320 executes a second job 321 to build the image for the Docker® container 350. The job engine 320 executes a third job 321 to create a network environment for the Docker® container 350 according to the receiver request in coordination with the network driver 332 and the libcontainer 340. The job engine 320 executes a fourth job 321 to build resources for the Docker® container 350 in coordination with the libcontainer 340 and a fifth job 321 to launch the Docker® container 350. After the Docker® container 350 is started or launched, the application may be executed in the Docker® container 350 with an isolated user-space. It should be noted that the job engine 320 may distribute the jobs 321 as described or alternatively configured as determined by a person of ordinary skill in the art to achieve similar functionalities.

As described above, container-based virtualization is light-weight when compared to hypervisor-based virtualization and yet provides a self-contained and a fairly isolated execution environment for applications. Thus, container-based virtualization is a popular solution for micro-services with light-weight resource constraints. The tools and the system infrastructure provided by Docker® as described in the system 300 also provides an attractive platform solution for IoT application developers to rapidly develop, test, and deploy IoT applications. However, the systems 200 and 300 may lack I/O supports or other commonly available OS services for meeting certain performance criteria, such as a guaranteed bandwidth and throughput, of IoT applications.

Disclosed herein are various embodiments for providing service-defined IoT containers by leveraging container-virtualization mechanisms and extending container resource constraints. The disclosed embodiments employ an IoT service manager to provision extended resources for containers. Extended resources refer to the resources that are not commonly provided by a certain container technology. For example, common resources may include filesystem, I/O paths, and relative CPU shares, whereas extended resources may include a guaranteed bandwidth, an absolute amount of CPU resources, IP packet filtering, security, and any other OS features provided by an underlying OS or extended features that are not part of the underlying OS. The IoT service manager acts as a proxy for a container engine of a particular container technology, such as Docker® as described in the system 300. For example, when the IoT service manager receives a user request to create a container, the IoT service manager analyzes the request to determine common resources and extended resources required by the container. The IoT service manager employs the container engine to create and build images and to allocate the common resources from the underlying OS kernel for the requested container. The container engine launches and executes the container. The IoT service manager reserves and allocates the extended resources from the underlying OS kernel to the container. The IoT service manager may dynamically modify, add, and delete the allocation of the extended resources. Although the present disclosure describes the service-defined container mechanisms in the context of Docker® container and Linux® OS, the disclosed embodiments are suitable for employment with any other type of container technology and any other type of OS.

Figure 4:
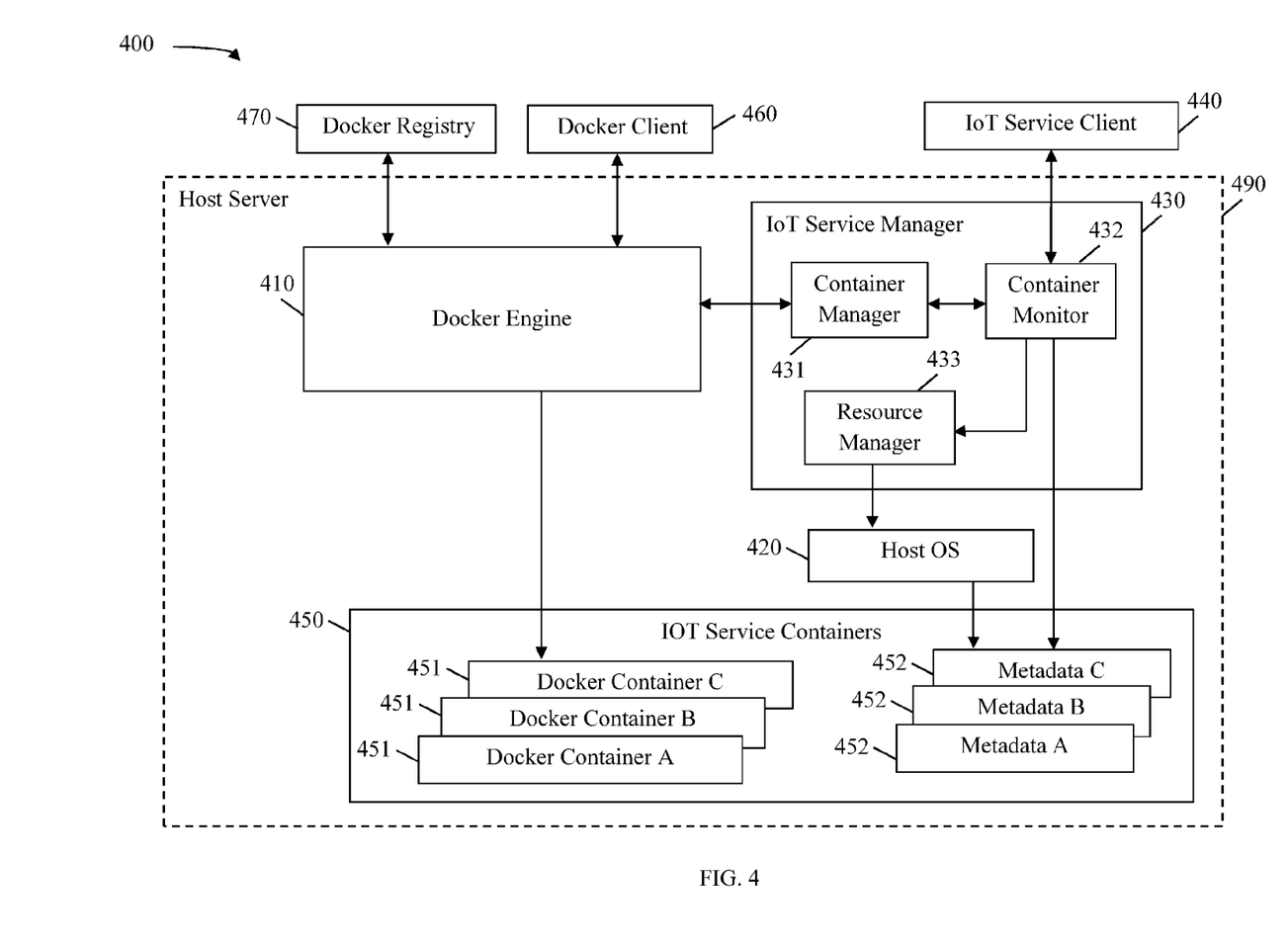
FIG. 4 is a schematic diagram of an embodiment of a service-defined container system.

FIG. 4 is a schematic diagram of an embodiment of a service-defined container system 400. The system 400 employs similar container-based virtualization mechanisms as the host server 200 and the system 300, and employs an IoT service manager 430 to provision extended resources for IoT service containers 450, which are also referred to as service-defined containers. The system 400 leverages the Docker® integrated environment described in the host server 200. As shown, the system 400 comprises the IoT service manager 430, the IoT service containers 450, an IoT service client 440, a Docker® client 460 similar to the Docker® client 360, a Docker® engine 410 similar to the Docker® engine 310, and a Docker® registry 470 similar to the Docker® registry 370. The IoT service manager 430 and the IoT service client 440 are software components. The IoT service manager 430, the IoT service containers 450, and the Docker® engine 410 are executed by a host server 490 similar to the host servers 100 and 200. The IoT service client 440 may be executed by a remote server or the same host server 490. The IoT service client 440 accepts user commands for creating, starting, managing, and modifying the IoT service containers 450. For example, the IoT service client 440 may interact with users via a command line interface (CLI).

The IoT service manager 430 comprises a container manager 431, a container monitor 432, and a resource manager 433. The container manager 431 is configured to dissect and analyze container requests to determine container resource constraints. The container manager 431 divides the container resource constraints into common resource constraints and extended resource constraints. The common resource constraints are constraints that are supported by the Docker® engine 410. Some examples of common resource constraints may include file system constraints, CPU utilization constraints, memory constraints, and I/O constraints. For example, a CPU constraint may be in the form of a relative weight of the shared CPU resource on the host server 490, but may not include a specific amount of CPU resource such as 1 gigahertz (GHz) of processing power. A memory constraint may be in the form of a specific amount of memory, but may not include a specific memory region. An I/O constraint may be in the form of a certain type of I/O interface, but may not include a guaranteed I/O bandwidth. The extended resource constraints may include functional constraints and any resources provided by the host OS 420. For example, extended resource constraints may include a specific amount of I/O bandwidth, a specific network quality of service (QoS), a specific CPU schedule for meeting a real-time constraint, specific packet filtering rules for firewall configurations, and a netlink socket for IPC between an IoT service container 450 and the host OS 420. In some embodiments, the extended resource constraints may also include resource constraints that are not directly supported by the host OS 420, for example, a constraint associated with a subsystem connected to the host server 490. The container manager 431 sends the extended resource constraints to the container monitor 432 and the common resource constraints to the Docker® engine 410.

The container monitor 432 is configured to monitor and track extended resource utilization of the IoT service containers 450. For example, upon receiving an extended resource constraint for an IoT service container 450 from the container manager 431, the container monitor 432 requests the resource manager 433 to reserve extended resources for the IoT service container 450 according to the extended resource constraint. While the IoT service container 450 is in operation, the container monitor 432 tracks and monitors the extended resource usage of the IoT service container 450. The container monitor 432 is further configured to communicate with the IoT service client 440. When the container monitor 432 receives a request from a user via the IoT service client 440, the container monitor 432 dispatches the request to the container manager 431 and/or the resource manager 433. The container monitor 432 may also send responses to the user in response to the requests.

The resource manager 433 is configured to reserve extended resources from the host OS 420 according to the extended resource constraints determined by the container manager 431. For example, the resource manager 433 may allocate, prioritize, and manage resources via Linux® cgroups. The resource manager 433 provides the reserved extended resources (e.g., metadata 452) to the IoT service containers 450. The resource manager 433 may also dynamically update resource allocation for an IoT service container 450 while the IoT service container 450 is in operation. For example, the resource manager 433 may add a new resource allocation to the IoT service container 450, modify an existing resource allocation of the IoT service container 450, and/or delete an existing resource allocation of the IoT service container 450.

To start an IoT service container 450, a user may send a request to the IoT service manager 430 via the IoT service client 440. Upon receiving the request, the IoT service manager 430 determines a common resource constraint and an extended resource constraint for the IoT service container 450, instructs the Docker® engine 410 to create, build, and start Docker® containers 451 such as the Docker® container 350 according to the common resource constraint, and provision extended resources for the IoT service container 450 in the form of the metadata 452 according to the extended resource constraint. As shown, an IoT service container 450 is formed from a Docker® container 451 and a metadata 452. For example, a Docker® container A 451 is provisioned with an extended resource metadata A 452. Each IoT service container 450 provides a separate user-space environment for executing one or more applications, such as the applications 143 and 253, and directly utilizes the OS services provided by the host OS 420.

Alternatively, the user may send the request to the Docker® engine 410 via the Docker® client 460. The Docker® engine 410 communicates the request to the IoT service manager 430. Similarly, the IoT service manager 430 determines common resource constraints and extended resource constraints for the IoT service container 450 and reserves extended resources for the IoT service container 450. The Docker® engine 410 creates, builds, and starts a Docker® container 451 according to the common resource constraints. The Docker® container 451 receives and utilizes the extended resources provisioned by the IoT service manager 430 to execute applications. In some embodiments, a user may also request a resource constraint update for an IoT service container 450 while the IoT service container 450 is in operation. In response to the request, the IoT service manager 430 may dynamically update the resource reservation from the host OS 420 and dynamically reconfigure the operating environment of the IoT service container 450.

Figure 5:
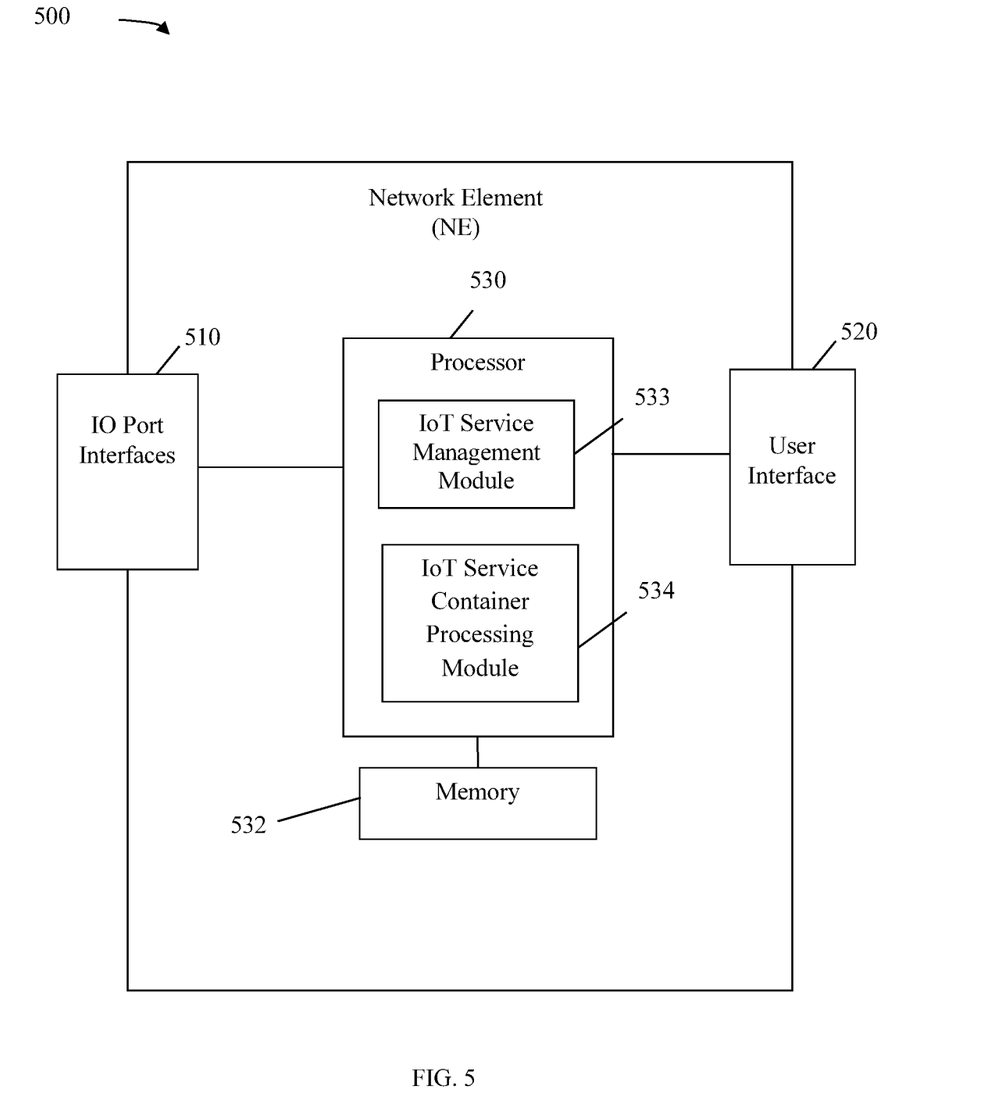
FIG. 5 is a schematic diagram of an embodiment of a network element (NE).

FIG. 5 is a schematic diagram of an embodiment of a network element (NE) 500. The NE 500 may act as network node in a data network or a server machine, such as the host servers 100, 200, and 490 and the system 300. NE 500 may be configured to implement and/or support the IoT service container creation and deployment mechanisms described herein. NE 500 may be implemented in a single node or the functionality of NE 500 may be implemented in a plurality of nodes. One skilled in the art will recognize that the term NE encompasses a broad range of devices of which NE 500 is merely an example. NE 500 is included for purposes of clarity of discussion, but is in no way meant to limit the application of the present disclosure to a particular NE embodiment or class of NE embodiments. At least some of the features and/or methods described in the disclosure may be implemented in a network apparatus or module such as an NE 500. For instance, the features and/or methods in the disclosure may be implemented using hardware, firmware, and/or software installed to run on hardware.

As shown in FIG. 5, the NE 500 comprises a processor 530 coupled to one or more memory devices 532, I/O port interfaces 510, and a user interface 520. The processor 530 may comprise one or more multi-core processors. In some embodiments, the memory devices 532 may be part of the processor 530, where the memory devices 532 may function as data stores, buffers, etc. The processor 530 may be implemented as a general processor or may be part of one or more application specific integrated circuits (ASICs) and/or digital signal processors (DSPs). The processor 530 comprises an IoT service management module 533 and an IoT service container processing module 534, which may implement methods 600 and 700, as discussed more fully below, and/or any other flowchart, scheme, and method discussed herein. As such, the inclusion of the IoT service management module 533, the IoT service container processing module 534, and associated methods and systems provide improvements to the functionality of the NE 500. Further, the IoT service management module 533 and the IoT service container processing module 534 effect a transformation of a particular article (e.g., the NE 500) to a different state. In an alternative embodiment, the IoT service management module 533 and the IoT service container processing module 534 may be implemented as instructions stored in the memory devices 532, which may be executed by the processor 530. The memory device 532 may comprise a cache for temporarily storing content, e.g., a random-access memory (RAM). Additionally, the memory device 532 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The I/O port interfaces 510 may be coupled to I/O devices, such as network devices and sensors, and may comprise hardware logics and/or components configured to transfer data between the I/O devices and the NE 500. The user interface 520 may be coupled to a remote server and may comprise hardware logics and/or components configured to receive user commands and send responses to the received user commands.

It is understood that by programming and/or loading executable instructions onto the NE 500, at least one of the processor 530 and/or memory device 532 are changed, transforming the NE 500 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 6:
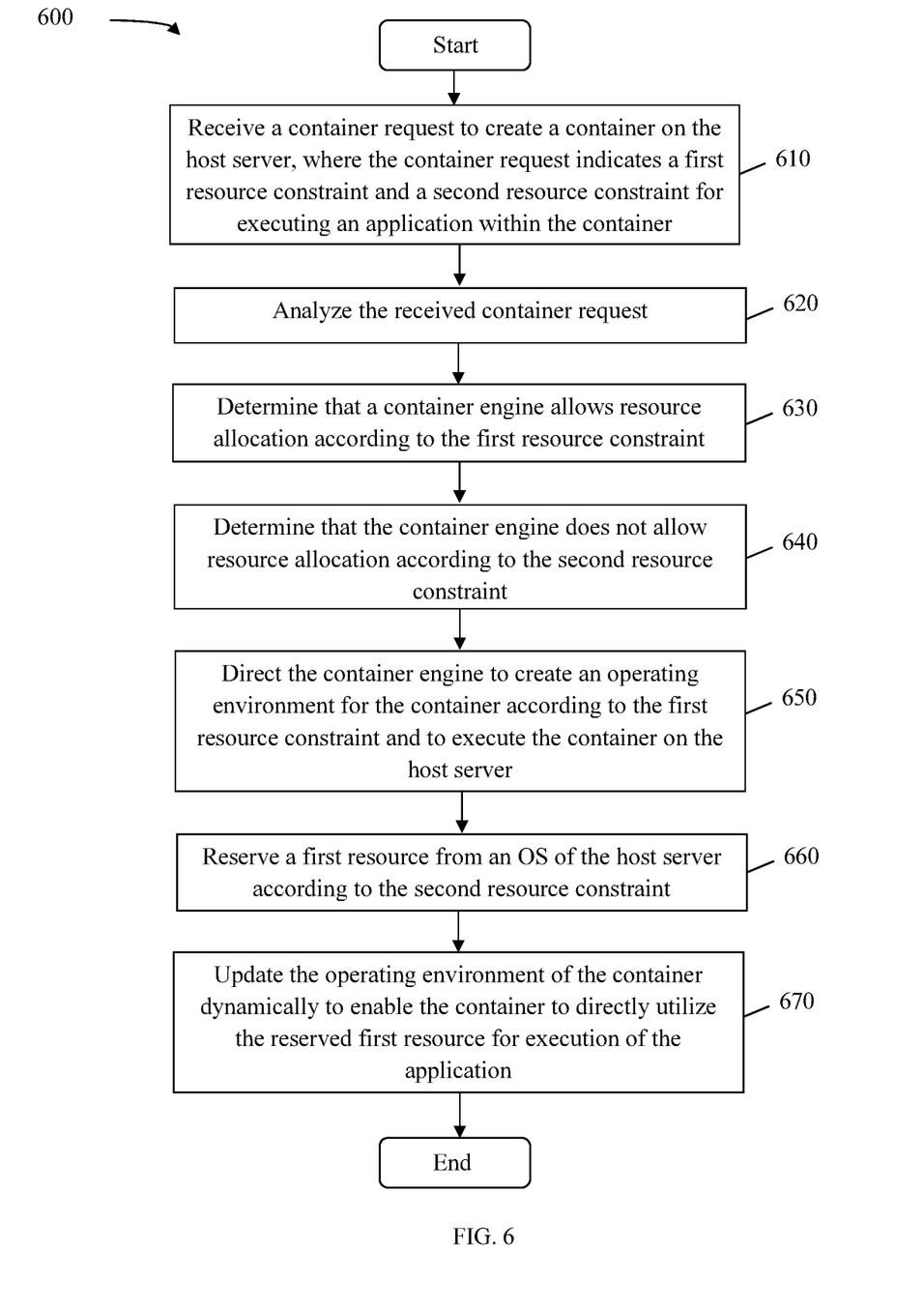
FIG. 6 is a flowchart of an embodiment of a method for providing a service-defined container.

FIG. 6 is a flowchart of an embodiment of a method 600 for providing a service-defined container, such as IoT service containers 450. The method 600 is implemented by a host server, such as the host server 490 or the NE 500. Specifically, the method 600 is implemented by an IoT service manager, such as the IoT service manager 430, when the IoT service manager receives a request for an IoT service container. The IoT service manager is implemented as a processing thread on the host server. The method 600 employs similar container resource provisioning and management mechanisms as described in the system 400. At step 610, a container request to create a container on the host server is received by the IoT service manager. The container request indicates a first resource constraint and a second resource constraint for executing an application within the container.

At step 620, the received container request is analyzed. For example, the first resource constraint and the second resource constraint are compared to the container provisioning capabilities of a container engine, such as the Docker® engines 310 and 410. At step 630, a first determination is made based on the analysis that the container engine allows resource allocation according to the first resource constraint. For example, the first resource constraint may indicate a relative resource sharing weight value for a particular resource. At step 640, a second determination is made based on the analysis that the container engine does not allow resource allocation according to the second resource constraint. For example, the second resource constraint may indicate an absolute amount of resource required for the execution of the application.

At step 650, the container engine is directed to create an operating environment for the container according to the first resource constraint and to execute the container on the host server. At step 660, a first resource is reserved from an OS, such as a Linux® OS and the host OSs 120, 220, and 420, of the host server according to the second resource constraint. At step 670, an operating environment of the container is updated to enable the container to directly utilize the reserved first resource for execution of the application. In an embodiment, the operating environment may be configured by employing hooks such as the Linux® hooks, which may be executed at any time during the lifetime of the container to configure environment variables for the container. It should be noted that the container engine may be any suitable type of container engine and the OS may be any suitable type of OS. In some embodiments, the container engine and the IoT service manager may communicate with each other through application programming interfaces (APIs). The steps of the method 600 may be implemented in the order as shown or alternatively configured as determined a person of ordinary skill in the art to achieve similar functionalities.

Figure 7:
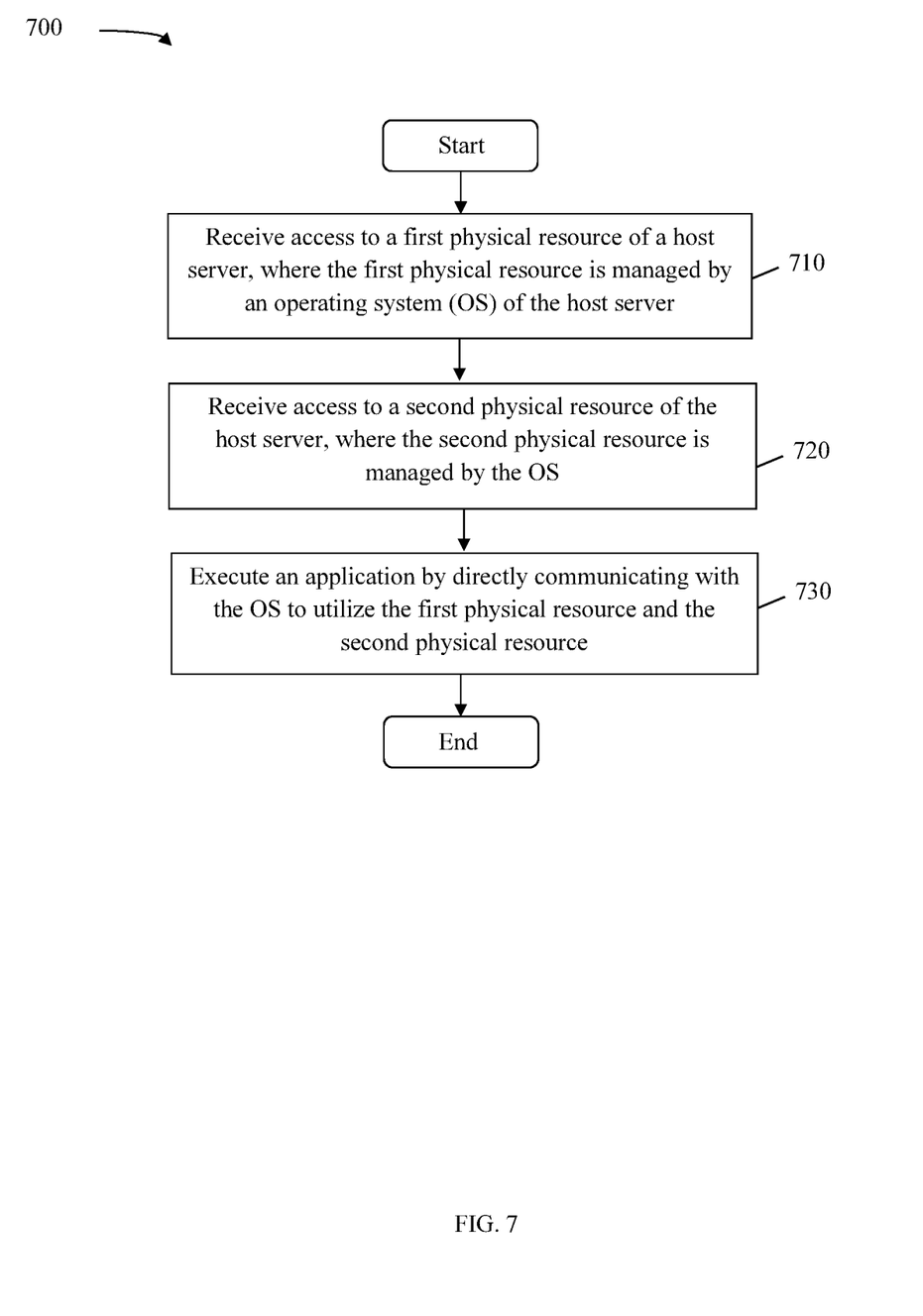
FIG. 7 is a flowchart of an embodiment of a method for executing an application in a service-defined container.

FIG. 7 is a flowchart of an embodiment of a method 700 for executing an application in a service-defined container, such as IoT service containers 450. The method 700 is implemented by a host server, such as the host server 490 and the NE 500. Specifically, the method 700 implemented by the container as a processing thread executing in an isolated user-space on the host server. The method 700 is implemented after the container is created and started by employing similar mechanisms as described in the system 400. At step 710, access to a first physical resource of the host server is received. The first physical resource is managed by an OS of the host server and may be reserved by a container engine, such as the Docker® engines 310 and 410. At step 720, access to a second physical resource of the host server is received. The second physical resource is managed by the OS and may be reserved from the OS by an IoT service manager, such as the IoT service manager 430. The first physical resource and the second physical resource are different orthogonal resources. Orthogonal resources are independent of each other and are allocated independently. For example, the first physical resource is a CPU resource and the second physical resource is an I/O bandwidth.

In an embodiment, the first physical resource comprises a relative amount. For example, each container executing on the host server receives a portion of a CPU resource represented by a weighting value of 1024. When one container is in execution, the container may receive about 100 percent (%) of the CPU resource. When two containers are in execution, each container may receive about 50% of the CPU resource. When three containers are in execution, each container may receive about 33% of the CPU resource. Conversely, the second physical resource comprises an absolute amount. For example, the second resource constraint may specify an about 1 gigahertz (GHz) of I/O bandwidth.

At step 730, an application is executed by directly communicating with the OS to utilize the first physical resource and the second physical resource. In some embodiments, while the application is in execution, the container may receive a new resource allocation, an updated portion of the first physical resource, and/or an updated portion of the second physical resource.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method comprising:
receiving, by a processing thread executing by a processor on a host server, a container request to create a container on the host server by employing a container engine, wherein the container request comprises a first resource constraint and a second resource constraint for executing an application within the container;
analyzing the container request, by the processing thread executing on the host server, in response to receiving the container request;
in response to the analyzing the container request, directing, by the processing thread, the container engine to create an operating environment for the container according to the first resource constraint and to execute the container on the host server when the container engine allows resource allocation according to the first resource constraint;
in response to the analyzing the container request, reserving, by the processing thread, a first resource from a host operating system of the host server according to the second resource constraint of the container request when the container engine does not allow resource allocation according to the second resource constraint;
updating dynamically, by the processing thread, the operating environment of the container to enable the container to directly utilize the reserved first resource for execution of the application to meet the second resource constraint of the container request; and
executing, by the processing thread, the application to meet the second resource constraint of the container request.

2. The method of claim 1, further comprising wherein the first resource constraint indicates a relative resource sharing weight value, and wherein the container engine is directed to create and start the container after analyzing the container request.

3. The method of claim 1, further comprising wherein the second resource constraint indicates an absolute amount of the resource required for the execution of the application.

4. The method of claim 1, wherein the second resource constraint indicates an absolute amount of input/output (I/O) bandwidth.

5. The method of claim 1, wherein the second resource constraint indicates an absolute amount of central processing unit (CPU) resource.

6. The method of claim 1, wherein the second resource constraint indicates a packet filtering rule for stopping traffic through the container that is associated with a specific Internet protocol (IP) address.

7. The method of claim 1, further comprising:
receiving, by the processing thread, a resource modification request indicating an updated second resource constraint while the container is executing on the host server;
reserving, by the processing thread, a second resource from an operating system (OS) according to the updated second resource constraint; and
updating dynamically, by the processing thread, the operating environment of the container according to the reserved second resource while the container is executing on the host server.

8. The method of claim 1, further comprising monitoring, by the processing thread, utilization of the resource by the container while the container is executing on the host server.

9. The method of claim 1, wherein the container request is received from a client via a command line interface (CLI).

10. The method of claim 1, wherein the container request is received from a user.

11. The method of claim 1, wherein the container engine is a Docker® engine, and wherein the OS is a Linux® OS.

12. A host server comprising:
an input/output (I/O) interface;
a user interface configured to receive a container request to create a container on the host server, wherein the container request comprises a first resource constraint and a second resource constraint for executing an application within the container; and
a processor coupled to the I/O interface and the user interface, wherein the processor is configured to:
analyze the container request in response to the user interface receiving the container request;
in response to analyzing the container request, reserve a first portion of a physical resource from a host operating system of the host server according to the second resource constraint when a container engine does not allow resource allocation according to the second resource constraint, wherein the container engine allows resource allocation according to the first resource constraint;
configure an operating environment for the container to directly utilize the reserved first portion of the physical resource for execution of the application; and
execute the application,
wherein the second resource constraint comprises an absolute limit associated with the I/O interface, and
wherein the first portion comprises an absolute amount of the physical resource.

13. The host server of claim 12, wherein the absolute limit is a guaranteed amount of transfer bandwidth of the I/O interface.

14. The host server of claim 12, wherein the processor is further configured to direct the container engine to create and execute the container according to the first resource constraint.

15. The host server of claim 14, wherein the processor is further configured to:
receive a resource update request indicating an updated second resource constraint while the container is in execution;
reserve a second portion of the physical resource for the container according to the updated second resource constraint; and
update the operating environment dynamically according to the second portion of the physical resource while the container is in execution.

16. An apparatus, comprising:
a receiver configured to receive a container request to create a container on a host server by employing a container engine, wherein the container request comprises a first resource constraint and a second resource constraint for executing an application within the container;
a processor configured to:
analyze the container request in response to receiving the container request;
in response to analyzing the container request, direct the container engine to create an operating environment for the container according to the first resource constraint and to execute the container on the host server when the container engine allows resource allocation according to the first resource constraint;
in response to analyzing the container request, reserve a first resource from a host operating system of the host server according to the second resource constraint of the container request when the container engine does not allow the resource allocation according to the second resource constraint;
dynamically update the operating environment of the container to enable the container to directly utilize the reserved first resource for execution of the application to meet the second resource constraint of the container request; and
execute the application to meet the second resource constraint of the container request.

17. The apparatus of claim 16, wherein the first resource constraint indicates a relative resource sharing weight value, and wherein the container engine is directed to create and start the container after analyzing the container request.

18. The apparatus of claim 16, wherein the second resource constraint indicates an absolute amount of the resource required for the execution of the application.

19. The apparatus of claim 16, wherein the second resource constraint indicates an absolute amount of input/output (I/O) bandwidth.

20. The apparatus of claim 16, wherein the second resource constraint indicates an absolute amount of central processing unit (CPU) resource.

* * * * *